Nov. 20, 1923. 1,475,112
W. N. GRIMES ET AL
EDUCATIONAL TOY
Filed Oct. 18, 1922 2 Sheets-Sheet 1

WITNESSES

INVENTOR
William Norman Grimes
Joseph Muenzmay
BY
ATTORNEYS

Nov. 20, 1923.

W. N. GRIMES ET AL 1,475,112

EDUCATIONAL TOY

Filed Oct. 18, 1922

Patented Nov. 20, 1923.

1,475,112

UNITED STATES PATENT OFFICE.

WILLIAM NORMAN GRIMES, OF ASPINWALL BOROUGH, AND JOSEPH MUENZMAY, OF PITTSBURGH, PENNSYLVANIA.

EDUCATIONAL TOY.

Application filed October 18, 1922. Serial No. 595,358.

*To all whom it may concern:*

Be it known that we, WILLIAM NORMAN GRIMES and JOSEPH MUENZMAY, citizens of the United States of America, and residents, respectively, of Aspinwall Borough, in the county of Allegheny and State of Pennsylvania, and Pittsburgh, in the county of Allegheny and State of Pennsylvania, have invented a new and Improved Educational Toy, of which the following is a description.

Our invention relates to an educational toy and has for its general object to provide a novel assemblage comprising a board and a plurality of figures varying as to form and size adapted for the teaching of art and designing and of a character to be highly entertaining and at the same time very instructive.

A further object of the invention is to provide an interesting toy which will develop the artistic faculties and cause an easy comprehension of the elements of design while demonstrating a comparison of size, area, etc.

A more specific object of the invention is to produce a toy of the indicated character at so low a cost as to bring it within the reach of all.

The manner and means whereby the above and other objects as will appear are attained will more clearly appear as the description proceeds.

Reference is to be had to the accompanying drawings forming a part of this specification, it being understood that the drawings are merely illustrative of one example of the invention.

Figure 1:
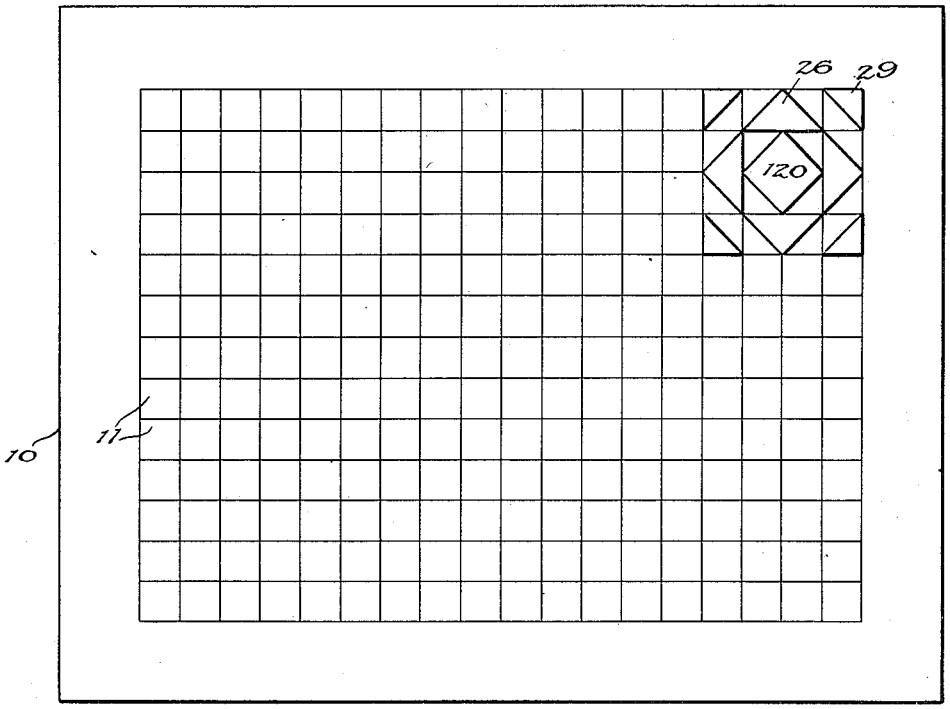
Figure 1 is a plan view of a base or planning board, the view including a representation of a design made up of elements included in our improved toy.
Figure 1:
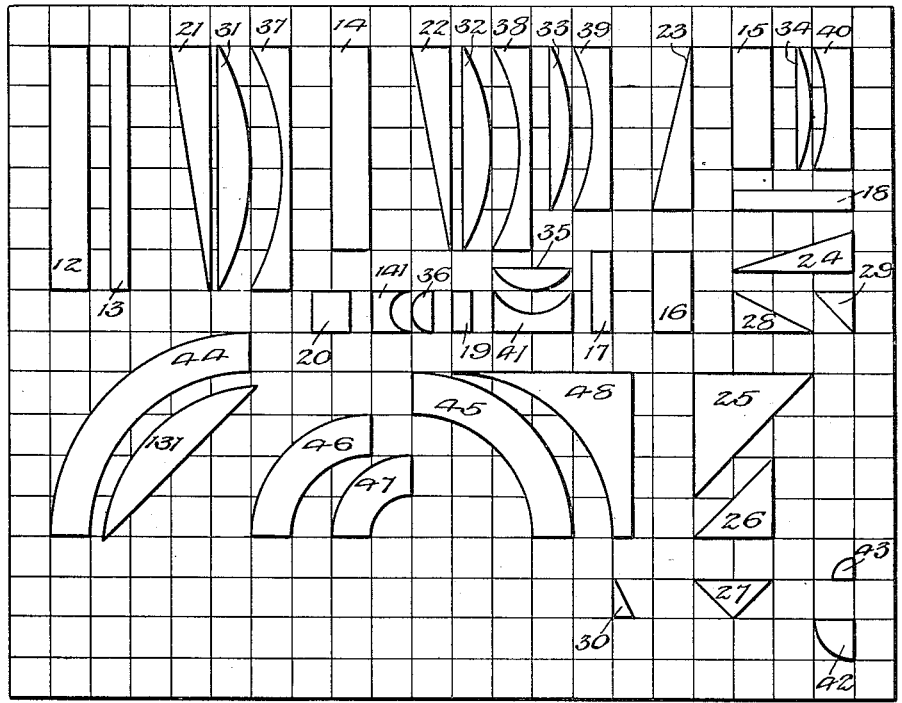
Figure 2:
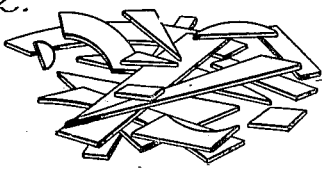
Figure 2 is a plan view of the board with a multiplicity of separate elements thereon available for the formation of various designs in coordination with the board.
Figure 3:
Figure 3 is a perspective view of the separate elements indiscriminately disposed ready for the selection of given elements to form a particular design.

In carrying out our invention in practice a board 10 is provided of any suitable material preferably cardboard and of any convenient size. The board may have any desired color but advantageously it is given a black surface in practice. The surface has ruled thereon for its major portion series of juxtaposed perfect and even squares to act as guides in the assemblage of the hereinafter described design elements. The design elements in practice are of such shapes and sizes as will provide a wide range of selection in the formation of the designs of different character. As an example we have shown an oblong element 12 having the width of a single unit square of the board and of a length to extend over six of the squares as well as an oblong element 13 of the same length as the element 12 but half the width. Another oblong element 14 is shown of a width to extend over one unit square of the board and of a length to extend over five squares. A further oblong element 15 is shown the width of a unit square and of a length to extend over three squares as well as an oblong element 16, the width of a unit square board and of a length to extend over two of such squares while an element 17 is shown the same length as the element 16 but half the width of the same and an element 18 having a width of the element 17 but a length to extend over three squares. A further oblong element 19 is shown half the width of a unit square and the length of a unit square. A square element 20 corresponding in both its superficial dimensions with a unit square of the board has also been provided. The elements 12 to 20 represent the rectangular elements of the assemblage but certain of these may vary in proportion as indicated at 112, 212, 312, 118, 119, 120, 217 and 317 in Figures 4 and 5.

A series of triangular elements is provided designated 21, 22, 23, 24, 25, 26, 27, 28, 29 and 30, said elements being different lengths to extend over more or less of the unit squares 11. In addition there is a series of elements presenting plano-convex form and of different lengths, these being designated by the numerals 31, 32, 33, 34, 35, 36 and 131, varying in length from the dimension of one square 11 to a length to extend over six or more squares. A series to mate the plano-convex members is provided designated by the numerals 37, 38, 39, 40, 41 and 141, the last mentioned being of a size to correspond with one square 11 and the longest one 37 being of a length to extend over six or more squares the design elements including furthermore relative small elements 42, 43, having two plane sides at right angles and the third a curved side joining the plane sides. Other elements included are a plurality of elements designated 44 to 47, consisting of sectors of a hollow circle. An element 48 is employed of a form to present a curved surface mating the convex side edge of one of the sectors 45, 47, the remaining edges of the element 48 being right angular and said element having the general form of a springer and side portion of an arch.

Figure 4:
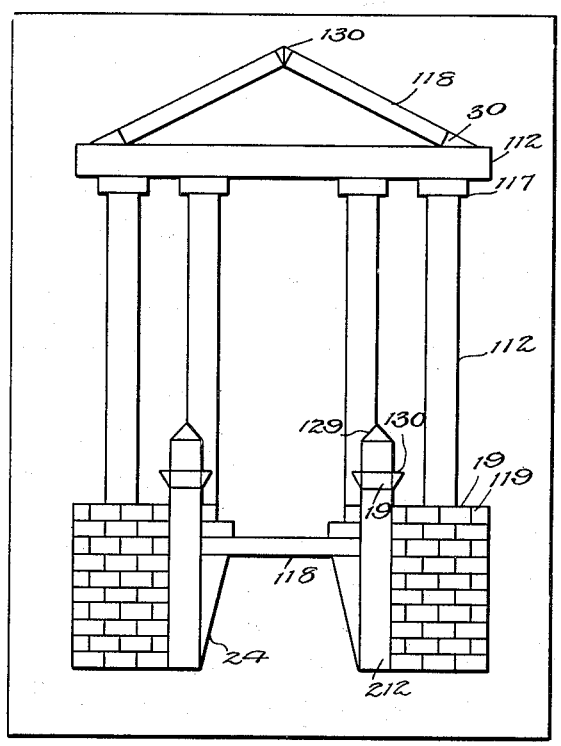
Figure 4 is a plan view showing a structure that may be made up of separate elements entering into the toy, the board being shown in outline.

The structure in Figure 4, it will be seen, represents a pillard architectural structure employing elements 19 and smaller elements 119, half the size; triangles 24, 30, 129, and 130, said triangles 129 and 130 differing from the elements 29 and 30 only as to size and oblong elements 117, 118 and 112, it being understood that the figures represented by the elements 112 may be made up of a plurality of elements 12 or 14 for example.

Figure 5:
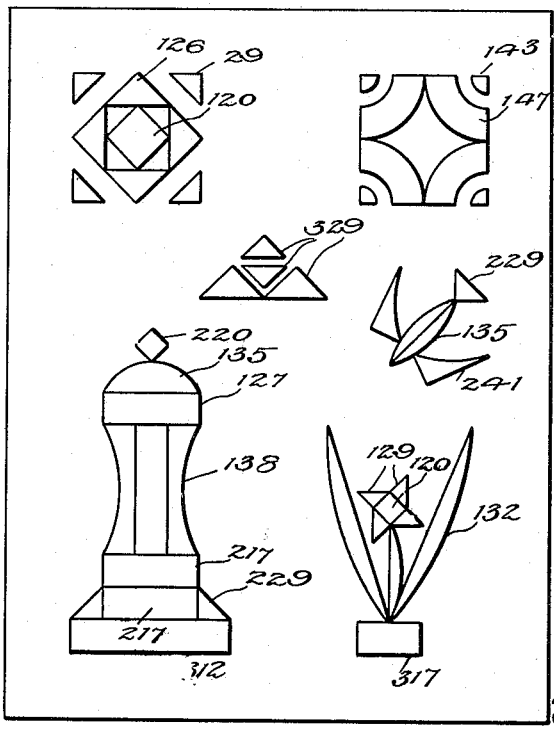
Figure 5 is a plan view showing a multiplicity of different figures made up of certain of the separate elements, the board being in outline.

In Figure 5 are conventional figures, there being at the upper left hand corner a design and at the right hand corner of Figure 1 a corresponding design made up of triangles with their bases opposed and enclosing a square 120 disposed as a diamond. Said square may be considered as formed by element 20 or may consist of a separate larger square. At the right of Figure 5 is a design made up of four of the sectors of the hollow circle and here designated 147 because shown slightly different in size from the element 47. At the corners adjacent the concave edges 147 are disposed elements 143 corresponding with the elements 43. Below said figure at the upper right hand corner is a conventional representation of a bird made up of elements 135, 229, and 241 corresponding except for the size with the elements 29, 35 and 41. In the center of Figure 5 is shown a figure made up of triangles 329 and 339, corresponding with the triangles 29 except for the size. At the lower left hand corner of Figure 5 is a structure simulating a stone structure and made up of elements 135, 138, 217, 220, 229 and 312, corresponding generally with the elements 35, 38, 17, 20, 29 and 12. At the lower right hand corner of Figure 5 is shown a conventionalized flower made up of elements 129, 120, 132 and 317, corresponding with the elements 29, 20, 32 and 17.

Having thus described our invention, we claim:

1. An educational toy including a board having a series of juxtaposed squares thereon, and a series of elements including a multiplicity of rectangular figures having a dimension representing a fraction of a unit square on the board as well as elements corresponding with the square in both dimensions, and elements corresponding in one dimension with the unit squares and having a second dimension representing a multiple of said squares; together with triangular elements of various sizes bearing a given relation to the squares on the board, plano-convex elements of various sizes bearing a given relation to the unit squares of a board, elements mating the convex edge of the plano-convex elements, and elements representing sectors of a hollow circle.

2. An educational toy including a board having a series of juxtaposed squares thereon, and a series of elements including a multiplicity of rectangular figures having a dimension representing a fraction of a unit square on the board as well as elements corresponding with the square in both dimensions, and elements corresponding in one dimension with the unit squares and having a second dimension representing a multiple of said squares; together with triangular elements of various sizes bearing a given relation to the squares on the board, plano-convex elements of various sizes bearing a given relation to the unit squares of a board, elements mating the convex edge of the plano-convex elements, and elements representing sectors of a hollow circle; together with elements presenting a convex side and two sides at right angles and joining the said curved side.

3. An educational toy including a board having a series of juxtaposed squares thereon and a plurality of assembler elements, each having one or more sides representing a fraction or a multiple of the sides of said squares, said assembler elements being characterized by a plurality of rectangular and triangular figures of various dimensions and by a plurality of plano-convex and plano-concave figures also of various dimensions, as well as sectors of hollow circles and figures having a curvilinear side bounded by sides at right-angles to each other.

WILLIAM NORMAN GRIMES.
JOSEPH MUENZMAY.